Jan. 31, 1956    W. D. FOSTER ET AL    2,732,754
FILM CONTAINING MAGAZINES AND FILM HANDLING APPARATUS
Filed July 13, 1951    3 Sheets-Sheet 2
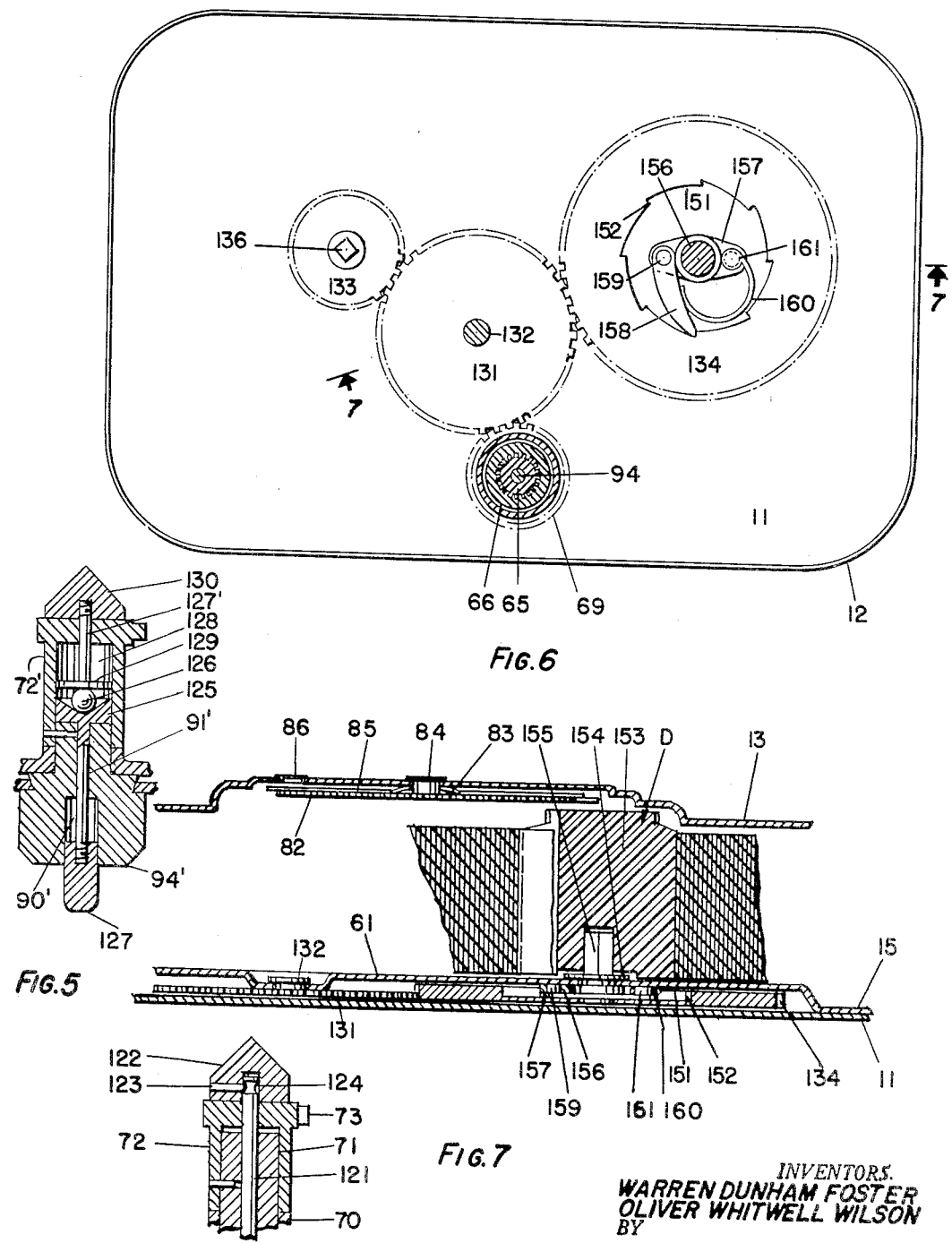
INVENTORS.
WARREN DUNHAM FOSTER
OLIVER WHITWELL WILSON
BY
Warren Dunham Foster
ATTORNEY INVENTORS.
WARREN DUNHAM FOSTER
OLIVER WHITWELL WILSON
BY
*Warren Dunham Foster*
ATTORNEY

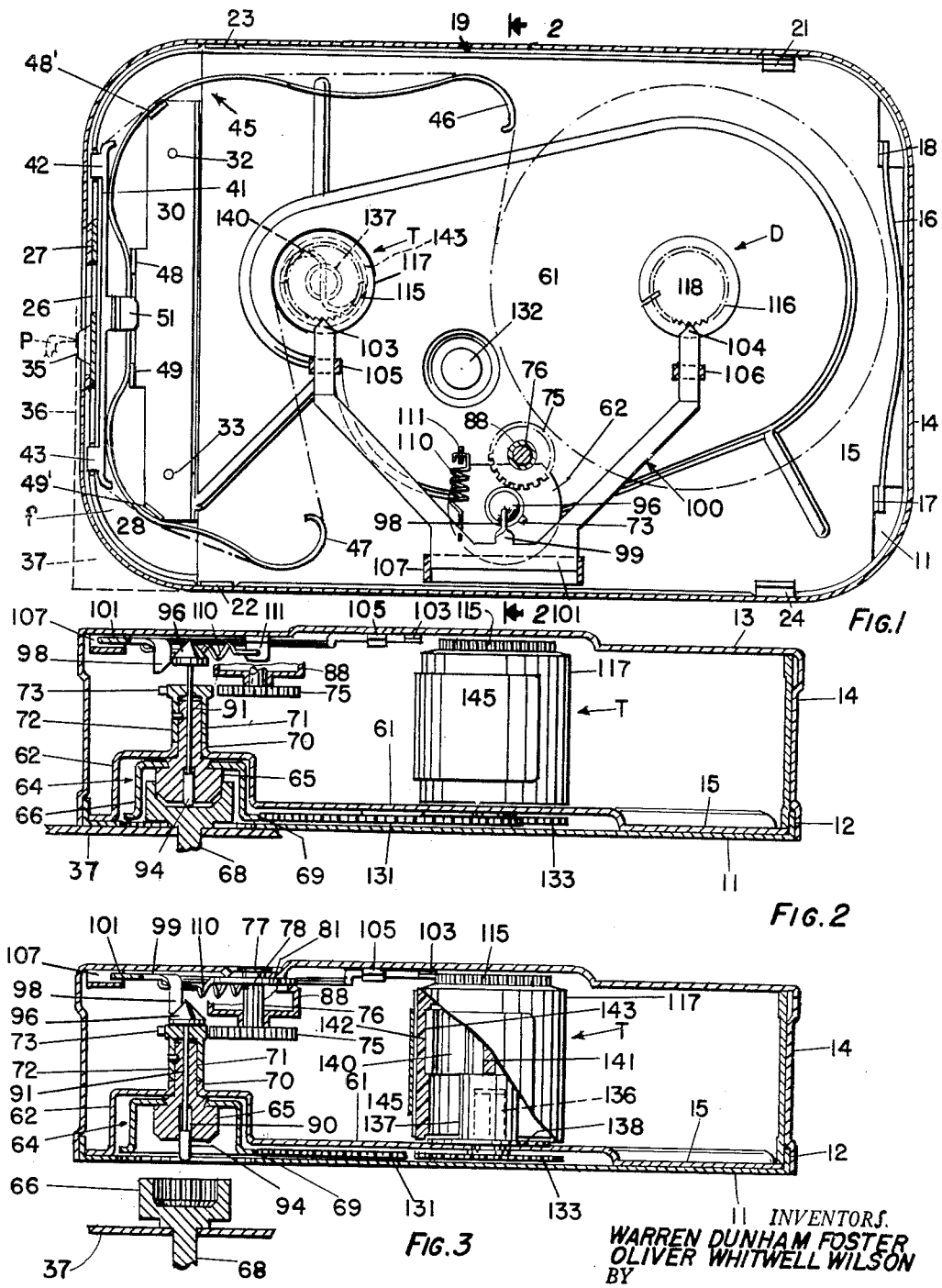

United States Patent Office 2,732,754
Patented Jan. 31, 1956

2,732,754

FILM CONTAINING MAGAZINES AND FILM HANDLING APPARATUS

Warren Dunham Foster, Eustis, Fla., and Oliver Whitwell Wilson, Arlington County, Va.

Application July 13, 1951, Serial No. 236,591

40 Claims. (Cl. 88—17)

Our invention may be applied to motion picture and other film handling and photographic apparatus for use by amateurs but its utility is not so limited. We are showing our invention in connection with a magazine containing a film for use in a camera but in many of its phases our invention is applicable to any apparatus for the projection or exposure or printing of pictorial or other images. We illustrate our invention as applied to a magazine of the type described and claimed in our co-pending parent application, Serial Number 7,926, filed Feburary 12, 1948, allowed October 20, 1950, which upon July 17, 1951, was patented as Number 2,560,564, of which this application is a continuation-in-part. In said co-pending parent application and in our co-pending application companion herewith Serial Number 236,592 divisional from said parent application filed July 13, 1951, we described a film handling magazine containing both a delivery and take-up mass of a film, a channel disposed therebetween, said channel including an apertured gate and spring elements characteristic of the Bundick and Proctor tension control system of feeding, a drive for a take-up, and a footage recording device, all or a portion of said elements being illustrated as mounted upon a chassis plate and bodily removable therewith from an outer protective container. We also describe and claim in said parent and companion applications means for locking a film against unwanted unwinding prior or subsequent to a regular feeding operation.

A basic object of our present invention is to present improvements in said tension control system of feeding and said locking mechanism provided in said above mentioned applications and those related thereto which are mentioned therein together with powered means for driving a delivery mass of a film particularly when the weight of the delivery mass is relatively high as before unwinding is fully under way and also at all times when a feeding operation is being started.

We illustrate our invention as applied to interchangeable magazines of the types described above but its use is not so limited. Moreover under many conditions all phases of our invention may be embodied in film handling apparatus not of the magazine type and making use of open reels of film.

One chief purpose of an interchangeable film containing magazine is to make the threading of an apparatus with which a film is used simple, safe and quick and without trouble or requirement of the exercise of skill. All that a user of such a magazine is required to do is to drop it into position in his camera, close and latch a door and take a picture. He need not touch the film housed within the magazine preparatory or subsequent to exposure. Also such a magazine for use with a camera should be so constructed that it can be easily, quickly and cheaply loaded with a film by a manufacturer before it is sent out and the film after exposure when the magazine has been sent back to the manufacturer or to a service station removed therefrom for processing. A magazine should be relatively inexpensive and sufficiently rugged to withstand many usages, thus reducing the total cost per unit of film exposed or projected. Also the film must be fed without danger of jamming or other difficulty and must be closely maintained in all planes in the exact wanted position so that the image impressed thereupon or projected therefrom will be accurate and pleasing. Our invention contributes materially to the improved accomplishment of these as well as other results.

As is well known to those skilled in this art a film at the point of translation of an image moves intermittently (except in the little used system of optical rectification) while the delivery and take-up masses move continuously. If compensation for these differences of characteristics of movement is not supplied, the exposed or projected image at best becomes unsteady and the driving perforations are damaged and at worst the film is broken.

We illustrate our invention as applied to interchangeable magazines of a type wherein the tension control system of feeding furnishes this compensation in a manner first taught by Bundick and Proctor in their Patent Number 1,944,022. According to this system spring pressure automatically applied by a film itself in step with the action of an intermittent pull-down maintains the entire unwound length of a film continuously under carefully regulated tension but with delivery and take-up portions moving at regularly varying rates of speed while an intermediate portion is held motionless at a point of translation for exposure or projection. For full functioning of this system the resilience applied upon one side of a gate must be carefully balanced against that applied upon the other side and in relation to the speed of a pull-down within each cycle of intermittent operation, as well as in relation to the weight of the maximum masses of film handled. As long as the flexing of the spring arms is closely in step with the operation of the pull-down so that the flow of the film above and below the gate is continuous and under tension wide variation of all factors is possible. This system of feeding was first applied, by the senior applicant herein, to a magazine in Patent Number 1,975,782 and developed in widely utilized commercial forms by Morsbach et al. and others illustrated in such patents as Number 2,159,998 and Number 2,175,538 and in other patents of the same groups. Magazines of this type, widely used throughout the world for many years, often under most adverse conditions, have proved rugged, inexpensive in first and maintainence cost, long lived, and simple to service even by inexperienced persons. This tension control system of feeding was first applied to magazines of the Ford type as exemplified in Patent Numbers 1,944,023 and 2,048,691 wherein an element of a gate which determines the focal plane at which a film is projected or exposed and hence the optical efficiency of the feeding operation was disposed upon the apparatus with which a magazine was employed.

According to another system also in wide use today, compensation is secured by continuously rotating sprockets (or a single sprocket) with associated loops of slack film, these sprockets being disposed within a magazine and driven by a connection with a power train of an apparatus with which it is used. This system has been characterized as the Thornton type and is shown for example by his British Number 164,467, accepted June 6, 1921, or by his United States Patent Number 1,716,990 or such patents as that to Wittel 2,043,914. Highly skilled workers using delicate gages and other instruments service such magazines at central points. These loops are originally set by hand and when such magazines are in use must be maintained at the proper size by the continuous rotation of a sprocket or sprockets. Particularly in recent years in this sprocketed type of magazine both members of the gate, fixed and movable, have been mounted within the magazine itself thus much complicating problems of design and construction because of the limitations of space created by the positioning of these additional elements in the necessarily restricted space of the magazine and the necessity of establishing and maintaining within very close limits the focal plane of the film by elements disposed within the relatively small, fragile and often misused magazine instead of upon the relatively sturdy, expensive and more permanent apparatus. Large numbers of such magazines particularly when used under adverse conditions wherein it is necessary for fresh films to be inserted by relatively unskilled persons under field conditions have been converted to make use of the tension control system of feeding, such for example as that magazine designated by the United States Government as AN A 6. Moreover magazines making use of the tension control system have been manufactured in large numbers to fit into camera compartments of a size and shape and disposition of driving parts originally designed to receive magazines of the Thornton type. Since such magazines originally intended for a sprocketed type of compensation or both gate plates within an outer container or both have demanded dimensions and positioning of parts which engage upon an apparatus with which a magazine is used different from those of the said tensioning controlling and single gate Ford type, certain changes must be made for greatest efficiency in magazines which are thus interchangeable although of these different characteristics.

In magazines making use of the Thornton type of feeding as recently developed the delivery and take-up masses have been placed in alignment with each other with their axes within a horizontal plane, such plane being parallel to the long edge walls of a magazine. On the contrary the successful tension controlling magazines to which reference has been made hereinabove were originally designed with the axes of delivery and take-up masses in a vertical plane. That is to say a line joining the axes of rotation of the delivery and take-up masses is normal to the optical axis of exposure while in the Thornton type such a line would be parallel or in some instances coincidental therewith. As a consequence in the original widely used tension controlling type of magazine the exposure aperture has been in a relatively long edge wall while the magazine when in a camera has rested so to speak upon a short edge wall. In the later Thornton magazines, however, the aperture has been in a short edge wall and the magazine has rested upon a long edge wall. As a result when a tension controlling magazine is used with a camera having a magazine-receiving compartment originally adapted to receive a Thornton magazine the film from one of the masses to the gate must be transported over the other mass of the film and then led to the exposure aperture. As a consequence the distance between one of the masses (in practice a delivery mass) and the exposure aperture has been very much greater than the corresponding distance between an exposure aperture and the other mass (in practice a take-up mass) since it is the take-up mass which is disposed relatively adjacent the aperture. As a consequence in the early magazines adapted from the tension control systems for use in compartments originally intended for the other system the film occasionally has been subjected to very acute bends and to a path which has prevented the tension control system, simple as it is, from operating at maximum efficiency. One of the primary objects of this invention, therefore, is to present an improved construction wherein the tension control system of feeding is applied to a magazine wherein the two film masses are disposed in horizontal rather than vertical relation to each other. A related object is to make the arrangement of the exposing aperture and the positioning of the two film masses more elastic and when such arrangement is less compact to provide improved tensioning and guiding channels which with maximum efficiency compensate for the differences in characteristics of feeding between continuously rotating delivery and take-up masses and a section of the film which moves intermittently at the point of translation.

An object of the present invention, therefore, is to provide improvements in the tension control system of feeding applied magazines which overcome the above difficulties and at the same time, irrespective of the particular requirements of this adaptation, result in a more efficient magazine.

A characteristic of the said Morsbach tension controlling magazine is that guiding elements at a point of translation are continued in the form of spring members which form a portion of a channel between delivery and take-up masses and the gate as well as furnishing carefully calculated resilience necessary for this system of feeding. An object of the present invention is to improve these tension arms so that they are better adapted to a magazine of a size and arrangement of elements which permit its use in a magazine-receiving compartment originally intended for a Thornton type of magazine. One means to this end includes construction of each of these spring arms of two spaced portions which engage the film thereby directly applying this tensioning pressure to a relatively greater length of the film and increasing the length of the channel formed by the arms but not at the expense of a long area of contact between the film and the arms. Since these tensioning arms are suitably relieved there is no danger of scratching. It is desirable to minimize the area of contact primarily because of a tendency that an over great length of contacting surface may place too much of a drag upon the film and thus interfere with the smooth operation of the compensation operation. An object of the present invention is to secure this result.

This tension control system of feeding for its best operation demands that bights of proper size and shape be established above and below the gate, these operations being the product of the shape and positioning of the spring arms and their resilience in cooperation with a film as it is fed in continuous contact therewith. Portions of the film above and below the point of translation must engage these arms in curves of substantial radius yet without sharp or abrupt bends. An object of this invention is to provide an improved device of such characteristics, preferably one wherein no angle made by the film is acute.

For various reasons primarily to save space it is often thought necessary to place supports for delivery and take-up masses of a film at such points where the path of the film between the masses and the point of translation is either over long or if unmodified has abrupt bends. As a result of these and other considerations the critical requirements of the Bundick and Proctor system have not always been fully met. An object of the present invention is to overcome these difficulties in a simple and effective manner. We have found desirable under such conditions the use of an auxiliary tensioning spring engaging the side of the film opposite that in operative contact with the primary tensioning arms, whether these primary arms have two spaced areas of contact, as we prefer for many purposes, or only one, in order to maintain the film in correct operative relation with these primary arms and furnish useful additional resilience, all properly timed to operate in step with the pull-down. An object of this invention is to provide such improvements in the Bundick and Proctor system of feeding as applied to a magazine and otherwise.

When a large mass of film is to be fed, particularly with the tension control system which utilizes only one toothed element engaging the perforations of the film to advance it, it is often desirable to give an initial impulse in a feeding direction to a non-driven delivery mass so that the film at the beginning of a feeding movement or at other times when unusual inertia is to be overcome does not drag upon the teeth of the pull-down. Such extra strain if it exists in a length of film such as that ordinarily employed in a magazine does not strain the perforations or cause other structural damage but a smooth kinetic flow at the point of exposure or projection may not occur until after such initial or especially great inertia is overcome. As a result, images fed under such conditions if in a camera may be over-exposed or in any film handling apparatus may be slightly blurred. If such difficulties occur with a sprocketed feed in addition the unsupported loops of slack film upon which such system depends may be changed in size or actually lost, with the unfortunate results well known in this art. Consequently a powered temporary drive of a delivery mass is also useful in a sprocketed magazine. Need for such drive is greater under adverse conditions, such as extreme cold as that of high altitudes in cameras used on aircraft. To overcome this difficulty as in the patent to Morsbach et al. 2,195,538 an initial "booster action" may be provided by an arrangement such as that shown in Figure 6 thereof whereby a power driven take-up mass makes contact with a pivotally mounted or floating delivery mass to give it this initial propulsion by skin friction. An object of the present invention, therefore, is to provide initial or emergency drive of a delivery mass by a positive connection with the power of the apparatus. To this end we provide for a delivery mass revoluble upon a fixed axis an over-running drive which is positive in its action but effective only when it is needed. Its operation ceases when the regular feeding of the film moves the delivery mass at its usual rate.

Better to adapt a magazine of the Morsbach type to use in apparatus designed for the Thornton type it is often desirable to change the direction of rotation in order to secure better feeding conditions, when controlled spring pressure is substituted for a continuously driven sprocket. An object of our invention is to produce a magazine with an efficient Morsbach feeding channel and a transposed direction of rotation of one film mass or both thereof.

Difficulties in film feeding particularly in magazines often arise from unwanted unwinding of a film prior or subsequent to a regular feeding operation as well as from improper unwinding after feeding has or should have begun. Such unwanted unwinding forms one very common cause of jamming, failure to maintain a film in the proper plane at the moment of translation and other serious difficulties. The natural elasticity of a film and other factors, such, for example, as jolts and jars in transportation and use, result in such unwanted unwinding or loosening of delivery and the take-up masses which may cause the film to block an exposure or projection channel so that when an attempt is made to begin or carry out feeding either the film does not move or it breaks. If these delivery and take-up masses are not kept tightly rolled even if feeding can be carried out without immediately noticeable interference with smooth flow of a film there is likely to be sufficient interference with proper movement that the pictures which are exposed or projected are unsteady. That is, even though a film may be fed longitudinally it may waver laterally at a point of translation. It is therefore desirable to lock the delivery mass of the film against movement in either direction and the delivery mass especially against unwinding movement.

If proper locking means are not supplied to prevent unwanted unwinding of a film a system of compensation may not operate properly or in some cases at all. To maintain delivery and take-up masses of the film against unwanted movement preliminary or subsequent to a regular feeding movement is necessary and critical in magazines of the Thornton type with their unsupported loops of slack film and desirable even in the simpler type making use of the tension control system of feeding.

In our co-pending parent and companion applications we describe and claim mechanism which directly locks a delivery support against unwanted unwinding and also locks a drive for a take-up. In the present invention we apply novel locking means directly to each film mass. In said co-pending applications the lock is rendered inoperative by the starting of the drive which moves the take-up and remains inoperative as long as this drive is operative. In the present invention the lock is disabled as the magazine is disposed in driven relation to its apparatus. A control member accomplishing this result is disposed entirely within the cross sectional area of our magazine thus making it extremely unlikely that it will be accidentally operated. This member is placed within but independently of motion-receiving portions of the drive and is engaged and operated by contact with motion-transmitting elements of the apparatus. Unlike the wholly different lock shown in our said co-pending applications, this device does not directly engage a toothed portion of a gear.

An important object of the present invention is to provide improved mechanism for locking a film against unwanted unwinding. A related object is positively to lock both a delivery mass and a take-up mass of a film, such lock preferably being applied directly to the supports for both such masses.

As known to those skilled in this art it is necessary for a user of a film handling apparatus to know the length of film which has been fed or remains to be fed. We employ such a footage recording device. If a film is permitted to unwind when not being regularly fed the indications given by a meter will be inaccurate. When as in the present invention we positively lock the entire unwound stretch of the film against any but a wanted feeding movement this difficulty cannot arise. An object of the present invention therefore is so to lock the film the regular movement of which is indicated by a meter.

We wish to emphasize that our invention although particularly useful in a magazine is not limited thereto but in many of its aspects may be applied to apparatus utilizing open reels of film. Also we wish to make clear that we are not limited to the particular magazine structures by which we illustrate our invention.

The objects of this invention will be clear from the above portion of this specification, the detailed description which follows, the subjoined claims and the accompanying drawings. These objects include improvements in the tension control system of feeding, provision of a delivery mass which is driven when need be, and an improved lock for positively holding all of the unwound length of film against unwanted unwinding, all illustrated as applied to a magazine but not limited thereto. Also included are improvements in magazine structure which better adapt the tension control system of feeding to use in magazines which occupy a space and cooperate with arrangements originally intended for magazines using a Thornton type of compensation and having both gate plates therein. Another object is generally better to adapt magazines of the tension controlling type to use in their new and compulsory environment in apparatus designed for sprocketed magazines, such magazines in large numbers having been displaced by those of the non-sprocketed type. Other objects, advantages and characteristics also will be evident. Although we are showing only preferred forms of our invention for the purpose of illustration it will be understood that changes can readily be made without departing from the scope of our broader claims or the spirit of our invention.

In the drawings:

Figure 1 is a top plan view of a magazine and a portion of a camera exemplifying our invention and showing the magazine with the cover removed.

Figure 2 is a section taken on the line 2—2 of Figure 1. It shows mechanism for locking delivery and take-up masses disposed in a feeding or unlocked position.

Figure 3 corresponds to Figure 2 but shows our locking mechanism in a locked or inoperative position.

Figure 4 (Sheet 2) is a fragmentary enlarged section corresponding to a portion of Figure 5 but showing an alternative control structure.

Figure 5 is a fragmentary enlarged section corresponding to Figure 4 and showing another embodiment of our control mechanism.

Figure 6 is a top plan view of our novel magazine taken from the under surface of the chassis plate looking downwardly and showing the bottom plate and drive.

Figure 7 is a partial section taken on the line 7—7 of Figure 6.

Figure 8:
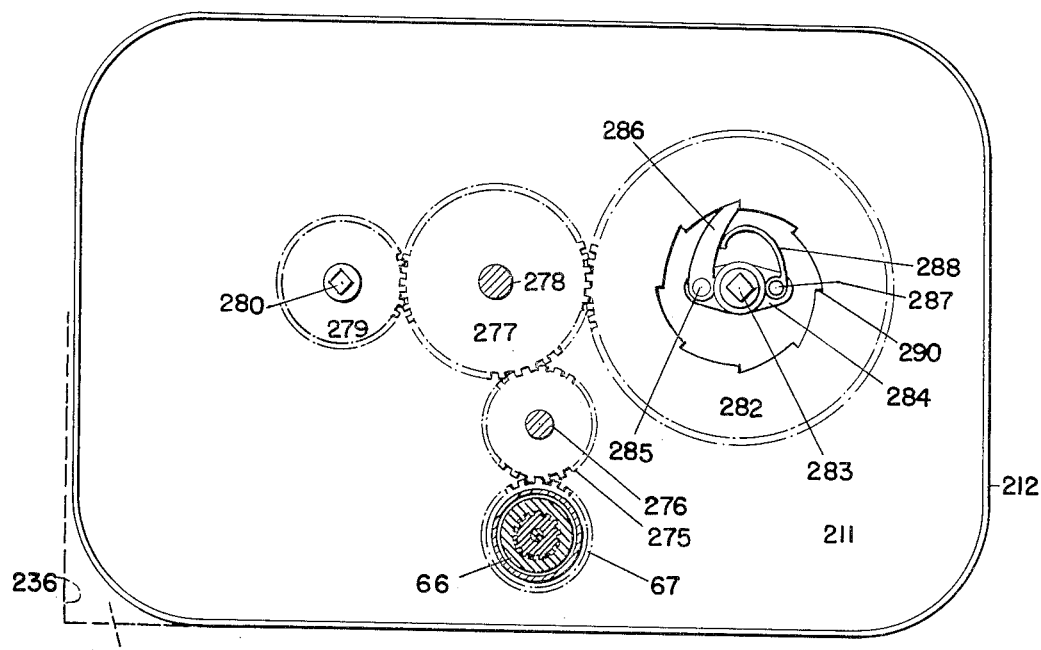

Figure 8 (Sheet 3) is a top plan view taken below the chassis and corresponding generally to Figure 6 but showing a different mechanism for occasionally driving a delivery mass and means whereby the film is unrolled and rolled in a direction opposite to that of Figure 1 and those associated therewith.

Figure 9:
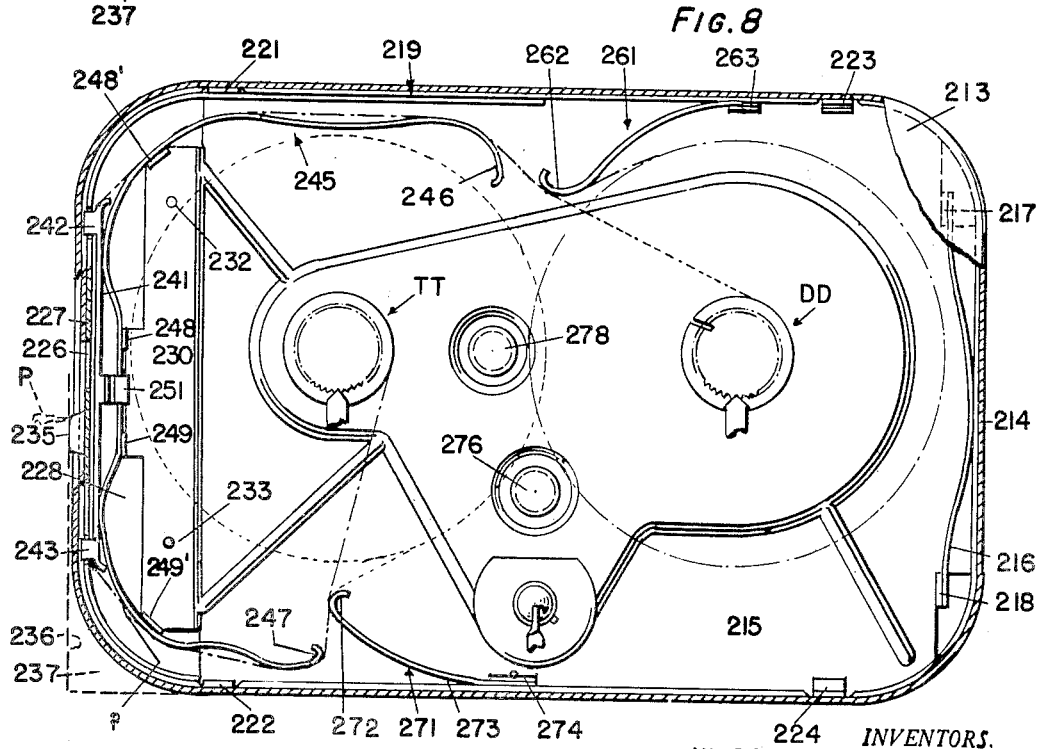

Figure 9 is a top plan view taken from above the chassis plate generally corresponding to Figure 1 but showing the important modification of our invention exemplified by Figure 8. It also illustrates improved mechanism for providing improved bights in a film.

For convenience in this specification and in the subjoined claims we are using the word "front" or "forward" as applied to that portion of a magazine or other structure which is relatively adjacent a lens when the magazine is within a film-handling apparatus and "rear" or "behind" and the like to designate those portions relatively distant therefrom. We use the word "bottom" to indicate the part of the magazine which supports the contents (or is adjacent a chassis plate which does so) and "lower" and those related thereto to designate those portions of the magazine relatively adjacent the bottom. Such words as "top" and "upper" indicate the opposite portion. This terminology follows the drawings. As a magazine is in position in common types of film-handling apparatus, the "bottom" and "top" of the magazine in reality form the sides since they are held in a vertical position. As is common in the use of such words in relation to containers the upper or cover part is that which overhangs. "Longitudinal" as applied to a path for the film indicates one coincidental with or closely adjacent the longitudinal axis of the film as it is being fed and "lateral" and words related thereto are used to mean a plane or objects falling therein normal to such longitudinal path and including the optical axis of the film at its point of translation. Other similar words and antonyms are used with similar or opposite meanings respectively.

As shown in the figures on Sheets 1 and 2 we may prefer to embody our invention in the form of a container which is composed essentially of a bottom housing 11 having low upstanding side walls or flanges 12, a top or cover housing 13 having relatively deep depending walls 14 and a chassis plate 15 which is disposed between said housings and completely encompassed and supported thereby. All operative parts of the magazine as shown in this application except the footage recording device are supported upon this chassis plate. It should be understood, however, that as in our said co-pending parent application we may mount all of these members directly upon a bottom plate of the magazine or we may mount the film engaging guiding and tensioning members upon the chassis plate and the driving members upon the bottom plate. It must be clearly understood, however, that we are in no way limited to the use of a chassis plate for our invention may be employed in a magazine without one. If we use a chassis plate, as we generally prefer, it may either be fixed to the bottom plate or positioned by a spring 16 supported by lugs 17 and 18 upstanding from the rear of the chassis. This spring bears against the back walls of the magazine and moves all film contacting members and the film into position determined by a lug later described, all for the purposes and as fully set out and claimed in our said copending parent application. Alternatively we may use mounting structure such as that illustrated in Figures 3a and 3b of said parent patent. That is to say the characteristic features of this invention may be included within any one of the major structural embodiments of our parent application. It will be noted, however, that herein we provide an improved film locking device which may be used alternatively to that which is described and claimed in our parent application.

The film is fed from a delivery mass generally indicated as D to a take-up mass generally indicated as T through a gate, the parts of which will be described in detail, and under the influence of a tensioning device of the Bundick and Proctor-Morsbach-Foster type, as exemplified in such patents as those to which reference already has been made. This gate consists essentially of a fixed apertured plate 19 which is attached to chassis plate 14 as by positioning lugs 21 and 22 which project upwardly from the chassis plate. Additional positioning lugs 23 and 24 together with those previously described also serve to hold the cover and bottom housings of the magazine in operative relation to each other. Locking mechanism such as described and claimed in our parent application may be employed in connection with these lugs and their associated parts. This fixed gate member is formed with an aperture 26, a film engaging portion 27 and a positioning formation 28 offset at right angles to the film engaging portion and disposed parallel and under a forwardly facing lip 30 slightly offset from the main body of chassis 15 and parallel thereto. By means of rivets 32 and 33 this apertured gate plate is shown as firmly fixed to the chassis member but if desired any of the attaching means shown in our said co-pending application may be employed. As shown in Figure 1 hereof we also place a positioning lug 35 upon the apertured gate member, this lug projecting forwardly and freely through an opening and into contact with an accurately formed surface 36 of a film-receiving compartment 37 of a camera with which the magazine is to be used. Alternatively as fully described and claimed in our said co-pending parent application we may place this positioning lug upon the chassis member. In either case this lug is so constructed that it accurately determines the focal plane of the magazine. In those cases in which the chassis plate 15 is resiliently carried within the magazine, it is not necessary to grind this lug after the magazine is assembled. Minor manufacturing variations are overcome by the spring mounting above described.

A presser member 41 having edge guides 42 and 43 which engage the top of the film as it is fed from the delivery to the take-up mass is loosely placed opposite the film engaging surface 27 of the apertured gate plate. This member is held in position against the film $f$ and presses the film against the apertured gate plate by means of a multi-purposed spring generally indicated as 45 and having a delivery tensioning extension 46 and a take-up tensioning extension 47. Lugs 48 and 49 struck upwardly from the said extension 30 of the chassis plate 15 serve to hold this spring in position as described above. Lugs 48' and 49 likewise struck upwardly from the chassis plate limit its inward movement. A combined finger piece and positioning member 51 is attached to or formed integrally with the presser plate and extends backwardly and slightly upwardly from that plate and over the top of the multi-purposed spring. The upper portion of this member engages the bottom surface of the cover 13. Thus the cover when locked in position tends to hold the gate plate, film and spring in their laterally correct position. Also this finger piece may be readily employed to move the presser member.

The chassis plate 15 may be mounted either by a spring as described and claimed in our said co-pending parent application or it may be riveted to the bottom housing of the magazine. In case a spring is used it must be understood that the total movement which is imparted to the chassis plate is relatively little and merely enough to overcome minor manufacturing variations and wear so that the film is always held in the focal plane of the camera lens.

Up to this point the construction which has been described is similar to that of our co-pending parent application and is claimed as well as described therein. We shall next describe our novel locking and driving mechanism which is characteristic of this invention.

A central portion 61 of chassis plate 15 is laterally and upwardly offset slightly to serve as a bearing surface and protection for the drive. This surface is formed into a further upward offset extension or bell 62 which houses a composite gear generally indicated as 64. This gear includes a toothed portion 65 which is driven by an appropriate gear 66 attached to a shaft 68 of the camera and an extension in the form of an inverted U the lower part of which includes a spur gear 69 which surrounds the driving portion 65, all being housed within or substantially within bell 62. Bell 62 is extended upwardly to form collar 70 which surrounds a shaft 71 which is formed with or attached to the multiple gear just previously described. Fixed to this shaft is a collar 72 which includes or has attached to it a one-toothed gear 73 which drives a spur gear 75 attached to a shaft 76 which is mounted by a pin 77 in cover 13. This shaft likewise has attached to it a gear 78 provided with a single tooth 81 which in turn engages and drives an indicating gear 82 (Figure 7) which by a leaf spring 83 and a pin 84 is likewise revoluble under and adjacent the cover 13. Between this cover and the indicating gear is a plate 85 revolved by the indicating gear and embodying numerals which indicate the amount of film which has been fed or remains to be fed, these numerals being visible through a window 86 formed in the cover of the magazine. By reason of the frictional mounting of this indicating gear it and the figures carried thereby may be reset by a resetting lug 87. A loose protective collar 88 prevents interference by the film. This construction of the footage indicating device itself is substantially the same as that described and claimed in our co-pending parent application.

As a user places the magazine in its compartment 37 driving gear 66 engages and drives motion-receiving gear 65 which through the train above described rotates plate 85 which indicates the exact amount of film which has been fed or remains to be fed since gear 69 through its associated spur gear 69 drives the take-up mass T. Since shaft 68 is integral with motion-transmitting gear 66 which is driven by the mechanism of the camera which positively powers claw P which moves the film, there is a direct mechanical interlock between the drive and the footage recorder. Thus the indication of the amount of film fed depends upon a positive connection and is in no way dependent upon frictional contact with the film or the diameter of a mass of the film. Such dependence at best is uncertain. For example thickness of a film may vary as does the tightness with which it is rolled.

This novel mechanism which positively drives the footage indicator or meter as described above also operates our novel locking arrangement as will be clear from Figures 1 to 3. Within shaft 71 a vertical axial opening 90 is formed into which is placed a control shaft or plunger 91 which is movable along the axis of the shaft 71 and compound gear 64. This shaft has a downward enlargement 94 and an upward conical head 96. This head operates as a cam engaging a follower 98 which is formed in an extension 99 of an irregularly V-shaped control member or yoke 100 which also embodies a guiding projection 101, a take-up locking tooth 103 and a delivery locking tooth 104. These locking teeth extend upwardly as viewed in Figure 1 and form the upper extremities of the arms of the V. This structure, which may be in the form of a thin stamping, is guided and held by straps 105 and 106 projecting downwardly from the top cover and engaging the arms of the V relatively adjacent the locking points and a strap 107 likewise projecting downwardly from the top cover and engaging the positioning formation previously described. A coiled spring 110 extends from a lug 111 likewise projecting downwardly from the cover to a point of attachment to the V-shaped structure adjacent the junction of the arms. By reason of this construction it will be seen that the spring 110 normally holds the V-shaped structure in the position shown in Figures 1 and 3. At this time the locking points 103 and 104 will be firmly held in engagement with teeth 115 and 116 which are formed in serrated annuli 117 and 118 respectively which are parts of the supports later described for the take-up and delivery masses. Thus when the parts are in the position shown in the figures the film cannot be moved either by power or its own elasticity. At this time spring 110 through follower surface 98 holds the operating control shaft 91 in the position shown in Figure 3.

When, however, a user places the magazine into contact with a film handling apparatus and gear 66 of the apparatus engages compound gear 65 preparatory to driving the mechanism, shaft 91 is forced upwardly from the position of Figure 3 to that of Figure 2. This operation cams the V-shaped structure downwardly as viewed in Figure 1 and forces follower 98 against the power of spring 110 to the left from the position shown in Figure 3 to that shown in Figure 2. As a result locking tooth 103 is removed from serrations 115 and locking tooth 104 from serrations 116 thus freeing the film for movement. When, however, the camera is removed from the film handling apparatus spring 110 forces follower 98 to move cam 96 and shaft 91 to the position of Figure 3 and the locking teeth again engage the serrations thus making movement impossible. It will be readily understood that our mechanism is equally operative whether the camera with which it is used is of the type in which a magazine moves in relation to the drive of a camera or the drive of a camera is moved into operative relation with a driven gear of the magazine.

The structure shown in Figure 4 (Sheet 2) is based upon a modification of the control shaft 91 of the figures just described. It will of course be recognized that this control shaft while the film within the magazine is being fed rests against the center of a revolving gear. Consequently by friction this shaft and the cam 96 are revolved by the gear although the area of engagement is so small and the contact so slight between gear and shaft that it does not revolve at the speed of the drive shaft. In some constructions it may not revolve at all. In the embodiment shown in Figure 4, however, a shaft 121 corresponding to the shaft 91 previously described supports a cam 122 at its extremity opposite that engaged by a driving gear of a camera. This cam is mounted upon a pin 123 freely revoluble within an annular slot 124 cut in the top of the shaft. In view of the slight power of relatively low speed of shaft 121 the slight friction between a cam follower such as 98 and the cam 122 is sufficient to hold the follower motionless. We may prefer to form the pin and in fact the whole cam structure from fiber. It is to be remembered that these parts are extremely small and light and that all quantities which are involved are small.

The operation of this form of our invention is similar to that previously described in connection with Figures 1, 2 and 3. As a magazine is placed in its compartment, shaft 121 is raised by contact between its lower end and the center of a gear such as 66. Thereby cam 122 moves upwardly as viewed in Figure 4 and cams follower 98 from a position such as that of Figure 3 to a position such as that of Figure 2 thereby moving locking teeth 103 and 104 away from serrations 115 and 116 thus freeing both the delivery and take-up masses.

The construction illustrated in Figure 5 is another variant of the control shaft of Figures 3 and 4 which reduces friction to an even smaller and entirely negligible value.

In this instance a revoluble control shaft or opening 91' operating through an enlarged opening 90' in attached to or formed with a cup-shaped collar 125 in which a ball 126 may freely revolve. The lower end of this shaft is attached to a narrow and long collar 127 which together with the structure just described moves freely up and down in opening 90'. Above ball 126 is a plunger 127' operating in an opening 128 formed in collar 72' which corresponds to collar 72 previously described. A head 129 of this plunger rests upon the ball. Attached to the upper end of the plunger is a cam 130 which corresponds to cams 122 and 96 previously presented. It will of course be understood that the structure just described is attached to and coordinated with the remainder of the magazine as described in connection with Figures 2, 3 and 4.

By reason of the above construction it will be noted that as the magazine is placed in position in a camera collar 127 will engage the center of a gear 66 and will thereby force cam 130 upwardly so that it operates follower 98 as previously described and unlocks the delivery and take-up masses. By reason of the co-action between the ball 126 and plunger face 129 practically speaking no rotary motion will be communicated by gear to cam 130.

After the delivery and take-up masses have thus been unlocked, feeding movement for the film is provided. A pull-down P engages the film at the aperture intermittently to advance it. Our novel over-running drive rotates the delivery mass at the beginning of every feeding operation thus delivering film to the pull down through the tensioning and guiding channel. This forced or powered drive is particularly useful when the mass is particularly heavy as at the start of such an operation after the magazine has been refilled and at such other times as resistance to proper movement of the film is over great. Mechanism disposed within the camera also frictionally revolves the take-up mass to wind up the film which has been so advanced by the pull-down.

As illustrated in Figures 6 and 7 we mount the frictional driving members for the take-up mass and the over running driving members for the delivery mass upon the chassis 15 but as stated in our co-pending parent application such members if desired may be mounted directly upon the bottom of the magazine. As previously described camera gear 66 drives compound gear 64 which includes a spur gear 69 which meshes with a relatively large spur gear 131 revoluble upon a pin 132 which extends from chassis plate 15 toward bottom plate 11. This gear drives two spur gears, a take-up gear 133 and a delivery gear 134. Take-up gear 133 is attached to and revoluble with a squared supporting portion or post 136 which coacts with a similar squared opening in a take-up core 137 which rests upon a bottom flange 138 which is attached to or formed as a part of the post. To this core an irregularly or S-shaped leaf spring 140 is attached by being slipped within a vertical slot 141. The edges 142 of this spring bear against an internal slot 143 circular in cross section formed in the upper portion of a take-up tube 117 upon which the film $f$ is wound and to which it is attached by a clip 145. If desired this internal slot may be knurled or otherwise roughened to increase the frictional contact between the spring and the take-up tube. Assembly consists merely of compressing the outer portion of the spring slightly as the tube is slipped over it. The slot holds the spring in place. The simplicity and compactness of this friction drive will be evident. For claims to this construction reference is made to our co-pending parent application.

As is explained in the introductory portion of the specification an important object of this invention lies in driving a delivery mass at those times in which otherwise it would present a considerable amount of inertia to the movement of the film. These means include devices whereby at other times when the film moves easily and freely the delivery mass is revolved by the traction of the film. To accomplish these ends delivery gear 134, which as previously described is driven by intermediate gear 131, is formed with a large internal opening 151 in which ratchet teeth 152 are cut.

The delivery mass D of the film is wound upon a hub 153 which rests upon a disc 154 which is formed upon a squared post 155 or attached thereto. This post is preferably formed as a part of a shaft 156 to which a yoke 157 is fixedly attached as by swedging. This yoke carries a dog or pawl 158 attached to a pin 159 fixed to or formed in one end of the yoke and pressed in a clockwise direction (as viewed in Figure 6) by a leaf spring 160 likewise attached to a pin fixed to the other end of this yoke as by a pin 161. By reason of this construction it will be seen that the powered revolution of gear 134 in a clockwise direction will be effective to drive the delivery mass in an unwinding direction, also clockwise, at such times as the traction upon the film $f$ is not such that it pulls the film from the mass at a rate faster than the powered drive. When the traction upon the film (and hence its speed) is greater, however, the yoke 157 will overrun and the dog 158 merely slip over the ratchet teeth 152. It will be understood that at the beginning of a film feeding operation or if any interruption of the normal flow of the film should occur this power drive will be effective. We later describe and illustrate in Figure 8 a drive wherein the rotation of the delivery mass is in the opposite direction in order thereby to provide a bight of different and improved characteristics.

It will be understood that the above feeding conditions are applied to a film which takes a path which is determined in a critical portion by the tensioning portions 46 and 47 of the multi-purposed spring 45 of Figure 1. As has been explained in the introductory portions of this specification in the Bundick and Proctor tension control system of feeding whether that system is applied in a magazine or otherwise it is essential that proper bights be formed and maintained. Under many conditions therefore it is desirable to employ the structure of Figure 9 (Sheet 3) wherein both the delivery and take-up bights are more closely confined and subjected to a larger amount of spring tension. To accomplish this end we prefer to supply for each mass two spring tensioning elements between which the film extends, one engaging one side of the film and the other engaging the opposite side. Thus we secure a double resilience, a more rigidly restricted bight and one of larger and hence more desirable radius.

In this embodiment of our invention the supporting and gate structures may be substantially the same as those previously described. In the immediately following portion of this description which describes the construction of Figure 9 the same reference numerals plus 200 are applied to parts which are the same or similar to those shown in Figures 1 and 2.

The container of a magazine is composed essentially of a bottom housing 211 having low upstanding side walls or flanges 212, a top or cover housing 213 having relatively deep depending walls 214 and a chassis member 215 which is disposed between said housings and completely encompassed and supported thereby. It should be understood, however, that we may mount all of these members directly upon a bottom plate of the magazine thereby omitting the chassis plate completely or we may mount the film engaging guiding and tensioning members upon the chassis member and the driving members upon the bottom plate. The chassis may be pressed forwardly by a spring 216 supported by lugs 217 and 218 or less desirably the spring may be omitted and the chassis riveted to the bottom.

This gate includes a long and curvilinear fixed apertured plate 219 mounted upon chassis plate 214 as previously described. Positioning lugs 221, 222, 223 and 224 assist in holding the cover and bottom housings of the magazine in operative relation to each other. This fixed gate member includes an aperture 226, a film engaging portion 227 and a positioning formation 228 offset at right angles to the film engaging section and disposed parallel and under a forwardly facing lip 230 slightly offset from the main body of chassis member 215 and parallel thereto. As by rivets 232 and 233 this apertured gate plate is shown as firmly fixed to the chassis member. A positioning lug 235 projects forwardly from the apertured gate member through an opening and into contact with an accurately formed surface 236 of a film receiving compartment 237 of a camera with which the magazine is to be used. Alternatively as in our said co-pending parent patent we may place this positioning lug upon the chassis. In either case this lug is so constructed that it accurately determines the focal plane of the magazine.

A presser member 241 having edge guides 242 and 243 which engage the top of the film as it is fed from the delivery to the take-up mass is loosely placed opposite the film engaging surface 227 of the apertured gate plate. This member is held in position against the film F and presses the film against the apertured gate plate by means of a multi-purposed spring as previously described in detail.

Up to this point the construction which has been described in connection with Figure 9 is similar to that of Figure 1. For further details reference is made to the previous description of Figure 1 and our parent co-pending application. We shall next describe our novel tensioning arms and over-running driving device for the delivery mass. In Figure 9 for clarity the film at the start of a feeding operation is shown in dot and dash line. At this time the mass DD upon the delivery support is at its maximum and that TT upon the take-up support at its minimum. Similarly when the film has been largely exposed or projected and a feeding operation is almost complete it is shown in dotted line; at this time the delivery mass is largely exhausted and the take-up mass at its greatest diameter.

An auxiliary delivery tensioning arm generally indicated as 261 having a film engaging and bight-forming curved portion 262 is attached to a lug 263 struck upwardly from the chassis plate 215 or it may be mounted directly on a wall of a container. As will be seen by an examination of Figure 9 this arm at all times whether the delivery roll is full or nearly empty maintains the film in a bight of considerable arc and in close and continuous contact with the operative end 246 of the primary tensioning member 245. Film engaging portions of the two arms 262 and 246 respectively engage the film upon opposite sides and are disposed relatively close to each other, as will be evident from an examination of Figure 9. Their arrangement is such, however, that the film at no time makes an acute bend. As is explained in the introductory portion of this specification the resilience of this arm 261 is carefully balanced against that of arm 246 and in relation to the speed within the cycle and power of the pull-down as well as the weight of the mass of film which is ordinarily employed, although this latter factor is subject to very wide variations. It has been found that the over-all speed of the pull-down within wide limits requires no modification of these relations. That is to say this auxiliary arm may be very stiff or very resilient depending upon the other kinetic factors which are involved. Such factors include the speed of the pull-down, the resilience of the primary tensioning member, and the mean weight and maximum diameters of the delivery mass. Under certain conditions this auxiliary arm may be entirely rigid and if desired a roller substituted for the film engaging curved section 262. Under a majority of conditions it is generally found desirable to make the auxiliary arm considerably stiffer than the primary arm.

A similar construction is applied to the take-up mass and for similar reasons. Under many conditions, however, an auxiliary arm is not necessary with the take-up mass because its greater proximity to the gate provides a sharper curvature in the film and a better bight without the need of auxiliary mechanism and since it is driven the problem of inertia is minimized. An auxiliary take-up arm generally indicated as 271 may have a film engaging curved portion 272, a supporting portion 273 and be attached to a lug 274 upstanding from the chassis plate or be attached directly to a portion of the container. The film engaging portion of these arms also engage opposite sides of the film and are disposed relatively close to each other.

As will be evident from the preceding portion of this description the direction of rotation of the delivery mass which is shown to illustrate this embodiment of our invention is opposite that previously shown in Figure 6. In this instance as shown in Figure 8 camera gear 67 through a spur gear 66 drives an intermediate gear 275 revoluble upon a pin 276 extending between the chassis plate and the bottom cover. This gear in turn drives a gear 277 attached to and revoluble upon a shaft 278 similarly mounted. This gear in turn drives a take-up gear 279 which through a post 280 and mechanism such as that previously described operates the take-up for the film.

This intermediate gear 277 also drives a delivery driving gear 282 which through a pawl and ratchet arrangement similar to that previously described drives the delivery mass DD at certain times in the feeding operation. In a manner previously described or in any other desired manner the delivery mass DD is attached to and revoluble with a post 283 to which a yoke 284 is fixed. By a pin 285 this yoke supports a pawl or dog 286. By a pin 287 it also supports a leaf spring 288 which bears against the under surface of the dog and tends to move it in a counterclockwise direction. Ratchet teeth 290 cut in an interior opening in gear 282 cooperate with the dog. When gear 282 is driven at a speed faster than that at which the film is being unwound by the pull-down P through the dog, yoke and shaft will overcome the inertia of the delivery mass and advance the film. When, however, the traction of the film unrolls it at a relatively greater speed the delivery mass will over-run the drive and dog and teeth will idle.

From the foregoing portion of this description it will be understood that we provide largely enclosed continuous delivery, exposing and take-up channels for the film as it is propelled or drawn from the support D or DD, pulled through the gate by the intermittent pull-down P and then wound up upon the take-up support T or TT. In the form of our invention illustrated in Figure 1, this multi-purposed channel is composed of the tensioning arms 46 and 47 formed in the multi-purposed spring 45 and the presser member 41 of the gate on the one side and the fixed apertured plate 19 with its film engaging portion 27 of the gate, supplemented by the adjacent walls of the magazine. In the form of our invention shown in Figure 9 this composite channel is provided by the spring 245 which is formed into a delivery channel or primary tensioning member 246 and a take-up channel or primary tensioning member 247 in cooperation respectively with the auxiliary springs 262 and 272 and the presser member 241. The other side of the channel is formed by the long aperture plate 219 together with the adjacent walls of the container. In both these embodiments it will be noted that the delivery channel bridges as it were the take-up mass. These delivery and take-up channels accomplish the double result of guiding the film and conditioning its movement, in a manner which eliminates continuously rotating sprockets with their unsupported loops of slack film. The locking members 103 and 104 closely cooperate with this composite channel by preventing the film through unwanted unwinding from blocking it. It will be noted that this lock positively holds the film immovable between its points of delivery support and take-up support.

Although we have illustrated a control mechanism of our invention as applied to a lock for the delivery and take-up masses it will be understood by those skilled in this art that this particular control mechanism, entirely novel so far as we have been able to learn, by which we control this operable element may be applied to any other element within a film magazine which is moved between two positions, as for a few examples only, a light trap, gate tensioning device, film marker or resettable meter. That is to say, although we illustrate this phase of our invention by operating a lock by our plunger which moves within an opening in a power-receiving gear of a film magazine it will be understood that any other operable part of a magazine can be so controlled. Also, it will be further understood that although we are exemplifying this phase of our invention in a film handling magazine for a film handling apparatus it can be applied to any accessory or secondary device having a revoluble part which is driven by a primary apparatus to which the secondary device is attached, power transmitting and power receiving gears being disposed in each and the accessory device having an element to be controlled in timed relation to its assembly with the primary device.

The advantages of our invention will have been made clear by the foregoing description and the attached drawings and are exemplified by the sub-joined claims. They include the provision in a film magazine of a delivery mass which is positively and mechanically driven only when such drive is necessary, improved tension controlling and channeling devices for use in use in a film magazine, positive locks for either or both of a delivery and a take-up mass, control mechanism positively operated when a magazine or other accessory device is placed in cooperative relation with its film handling or other primary apparatus, and improved construction of the tension control system of feeding particularly as applied to a film handling device originally designed for Thornton or sprocketed operation.

We claim:

1. In a film handling apparatus, a delivery support, a take-up support, an apertured gate therebetween, a pull-down for intermittently feeding a film from said delivery to said take-up support past said gate, an overrunning drive for said delivery support for propelling the film in a feeding direction from said delivery support toward said pull-down, a drive for said take-up support for concurrently revolving said take-up support in a feeding direction for winding up the film advanced thereto by said pull-down, tension controlling means cooperating with said gate to form a continuous channel for the film from said delivery support to said take-up support and conditioning the movement of the film, means for positively locking both of said supports so that unwanted unwinding of the film therefrom prior and subsequent to a regular feeding operation will not block said channel, and means for withdrawing said locking means from locking position so that such a feeding operation may be carried out.

2. In a film handling apparatus, a delivery support, a take-up support, an apertured gate therebetween, a pull-down for intermittently feeding a film from said delivery to said take-up support past said gate, a device for recording the footage of film which has been fed from said delivery to said take-up support past said gate, a drive for said delivery support for propelling the film in a feeding direction from said delivery support toward said pull-down, a drive for said take-up support for concurrently revolving said take-up support in a feeding direction for winding up the film advanced thereto by said pull-down, tension controlling means cooperating with said gate to form a continuous channel for the film from said delivery support to said take-up support and conditioning the movement of the film, means for positively locking both of said supports and said footage recording device so that unwanted unwinding of the film therefrom prior and subsequent to a regular feeding operation will not block said channel and cause said recording device to present a misleading record, and means for withdrawing said locking means from locking position so that such a feeding operation may be carried out.

3. In a film handling apparatus, a delivery support, a take-up support, an apertured gate therebetween, a pull-down for intermittently feeding a film from said delivery support toward said take-up support past said gate, a drive for said delivery support for propelling the film in a feeding direction from said delivery support toward said pull-down, a drive for said take-up support for concurrently revolving said take-up support in a feeding direction for winding up the film advanced thereto by said pull down, resilient tension controlling members forming a portion of a continuous channel for the film between said delivery support and said take-up support, said channel including said apertured gate, certain of said members including resilient surfaces engaging one side of the film at a plurality of points spaced from each other on each side of said gate respectively and certain other of said members engaging the other side of said film between said previously mentioned film contacting surfaces relatively remote from said gate and said delivery and take-up supports respectively, means for locking both of said supports so that unwanted unwinding of the film therefrom prior or subsequent to a regular feeding operation will not block said channel, and means for withdrawing said locking means from locking position so that such a feeding operation may be carried out.

4. In a film handling apparatus, a delivery support, a take-up support, an apertured gate therebetween, a pull-down for intermittently feeding a film from said delivery support toward said take-up support past said gate, a device for recording the footage of film which has been fed from said delivery to said take-up support past said gate, a drive for said delivery support for propelling the film in a feeding direction from said delivery support toward said pull-down, a drive for said take-up support for concurrently revolving said take-up support in a feeding direction for winding up the film advanced thereto by said pull-down, resilient tension controlling members forming a portion of a continuous channel for the film between said delivery support and said take-up support, said channel including said apertured gate, certain of said members including resilient surfaces engaging one side of the film at a plurality of points spaced from each other on each side of said gate respectively and certain other of said members engaging the other side of said film between said previously mentioned film contacting surfaces relatively remote from said gate and said delivery and take-up supports respectively, means for locking both of said supports and said footage recording device so that unwanted unwinding of the film therefrom prior or subsequent to a regular feeding operation will not block said channel and cause said recording device to present a misleading record, and means for withdrawing said locking means from locking position so that such a feeding operation may be carried out.

5. In a film magazine adapted for use in a film handling apparatus, said apparatus having a source of power, a magazine-receiving compartment, a pull-down engaging a film in a magazine disposed in said compartment, and a motion-transmitting connection accessible to a magazine within said compartment; said magazine having a delivery support, a take-up support, a drive for said delivery support for revolving said support for propelling the film in a feeding direction from said delivery support toward said pull-down, a drive for said take-up support for simultaneously revolving said take-up support in a feeding direction for winding up the film advanced thereto by said pull-down, a motion-receiving connection so disposed that when said magazine is within in said compartment it is engaged and driven by said motion-transmitting connection of said apparatus, means for operating said delivery and take-up supports, resilient tension controlling members forming a portion of a continuous channel for the film between said delivery support and said take-up support, said channel including an aperture, and means for rendering the film accessible to said pull-down when the magazine is within said compartment, certain of said members including resilient surfaces engaging one side of the film at a plurality of points spaced from each other on each side of said gate respectively and certain other of said members engaging the other side of said film between said previously mentioned film contacting surfaces relatively remote from said gate and said delivery and take-up supports respectively, means for locking both of said supports so that unwanted unwinding of the film therefrom prior and subsequent to a regular feeding operation will not block said channel, and means for withdrawing said locking means from locking position so that such a feeding operation may be carried out.

6. In a film handling apparatus, a delivery support, a take-up support, means for feeding a film from one of said supports to the other thereof whereby a film is unwound from one and wound upon the other, a detent structure attached to and revoluble with each of said supports, a locking tooth for each of said detent structures, linkage for concomitantly moving said teeth alternatively to locking position wherein each of said teeth engages one of said structures whereby each of said supports is positively locked against rotation and the stretch of film between said supports held motionless and to unlocking position wherein said teeth are moved away from said structures whereby said supports may be revolved and such feeding operation may be carried out, and control means for operating said linkage whereby said teeth are moved between said positions and said supports alternatively positively locked and unlocked.

7. In a film handling apparatus, a delivery support, a take-up support, means for winding a film from one of said supports to the other thereof, a serrated detent structure revoluble with at least one of said supports, a locking tooth engageable with a serration of said detent structure thereby positively locking said support against movement, a mount for said tooth, and means for moving said mount and said tooth away from said detent structure so that the film may be moved.

8. In a film handling apparatus, an apertured gate, a delivery support for a film upon one side of said gate, a take-up support for the film upon the other side of said gate, the film passing from said delivery support past the aperture of said gate to said take-up support, an annulus with serrated teeth revoluble with each of said supports, a locking member engageable with any one of said teeth of each said annuli irrespective of the position of said annuli relative to their axes of rotation for preventing the rotation of the associated support, and operable means operatively connecting said locking members for moving said locking members between a locked position and an unlocked position.

9. In a film handling apparatus, an apertured gate, a delivery support, a take-up support, means for intermittently feeding a film from said delivery support to said take-up support, a single V-shaped locking member, the extremity of each leg of the V being engageable with each of said supports and the lower junction of said legs embodying a cam follower, a spring urging said extremities into locking engagement with said supports thereby preventing their unwanted revolution and holding the stretch of the film between said supports motionless, a cam engaging said follower for moving said V-member against the power of said spring, and an operable control member for said moving cam thereby unlocking said supports so that the film can be fed.

10. In a film magazine, a delivery support, a take-up support, means for winding a film from one of said supports to the other thereof, a single V-shaped locking member the upper extremity of each leg of the V being normally engageable with each of said supports respectively for preventing the unwanted revolution thereof with consequent unwinding of the film, and a member operable from the exterior of said magazine for withdrawing said locking member from locking relation with said supports.

11. In a film handling apparatus, an apertured gate, a delivery support for a film upon one side of said gate, a take-up support for the film upon the other side of said gate, the film passing from said delivery support through said gate past the aperture thereof to said take-up support, a toothed locking formation revoluble with each of said supports, a locking member positively engageable with a tooth of each of said locking formations and preventing the rotation of the associated support, and a control member for moving said locking members between a locked position and an unlocked position.

12. In a film handling apparatus, an apertured gate, a delivery support, a take-up support, means for intermittently feeding the film from said delivery support to said take-up support, a multi-armed locking member, the extremity of each of two of the arms of said member being movable between a locking position wherein each of said arms engages one of said supports to lock it against motion and another or feeding position wherein each of said arms is free of engagement from the support with which it is associated, said member also embodying a cam follower, a spring for moving said locking member from one of said positions to the other thereof, and a control member including a cam engageable with said follower for moving said member against the power of said spring.

13. In a film magazine having an aperture, two supports for a film, the film passing from one of said supports past said aperture to the other thereof, a detent structure attached to and revoluble with each of said supports, a locking member engageable with each of said detent structures for preventing the rotation of the associated support and holding motionless the stretch of the film therebetween, and means operatively interconnecting said locking members for moving said locking members between locked position and unlocked position.

14. In a film magazine having an aperture, two supports for a film, guiding and tensioning members forming a clear channel for the film extending without obstruction from one of said supports past said aperture to the other thereof, operable locking mechanism directly engageable with each of said supports for preventing the rotation of said supports thereby positively holding the entire unwound stretch of film without movement, a control member disposed within the cross sectional area of said magazine and operable from without said magazine for moving said mechanism to unlocked position whereby the film may be advanced through said channel, and means for returning said locking mechanism to locking position.

15. In a film magazine, said magazine having an aperture and a side wall, a delivery support, a take-up support, means for feeding a film from one of said supports to the other thereof past said aperture, whereby the film is unwound from one and wound upon the other of said supports, a detent structure attached to and revoluble with each of said supports, a yoke disposed adjacent said side wall of said magazine, each of the arms of said yoke terminating in a tooth for cooperation with said detent structure, a spring normally urging said yoke toward said detent structures whereby said teeth co-act therewith to prevent the unwanted unwinding of a film, and means operable from without said magazine for moving said yoke against the power of said spring thereby moving said teeth from engaging relation with said detent structure whereby said feeding operation may be carried out.

16. In a film magazine; said magazine being adapted for use with a film handling apparatus which has a source of power and a connection for transmitting power from said source to said magazine when it is assembled therewith, said magazine having a delivery support for a film, a take-up support for the film, a power-receiving connection for said take-up support operable by the power-transmitting connection of said apparatus, a lock for at least one of said supports which when effective prevents the rotation thereof, and means for rendering said lock ineffective so that said power of said apparatus may move the film from one of said supports to the other thereof, said means including an actuating member for rendering said lock ineffective, said actuating member being so positioned and so disposed that it is operated and moved by contact with said power-transmitting connection when said power-receiving connection of said magazine is placed in power-receiving relation to said power-transmitting connection of said apparatus thereby releasing said lock so that said support may freely rotate.

17. In a film magazine; said magazine being adapted for use with a film handling apparatus which has a source of power and a connection for transmitting power from said source to said magazine; said magazine being formed with an aperture and having a delivery support for a film, a take-up support for the film, the film passing from one of said supports to the other thereof past said aperture, means for locking at least one of said supports to prevent its rotation thereby resulting in unwanted unwinding of the film, linkage for moving said locking member from locking position, a train of gears for driving at least one of said supports, said train including a motion-receiving member extending to a position accessible from the exterior of said magazine wherein it is engageable by said motion-transmitting connection of said apparatus when the magazine is assembled therewith, and a plunger bodily movable within an opening in said motion-receiving member and independently thereof, said member being formed with such an opening, one end of said plunger extending to a point wherein it is engageable with and movable by contact with said apparatus when said magazine is assembled therewith and the other end of said plunger by such movement engaging and operating said linkage thereby unlocking said supports.

18. In the combination of a film handling apparatus and a film magazine, said film handling apparatus having a magazine-receiving compartment, a source of power, a pull-down operated by said source of power, and a gear for transmitting power from said source to said magazine when it is disposed in said compartment, said magazine having a delivery support for a film, a take-up support for the film, means establishing an apertured channel through which the film passes from said delivery support to said take-up support, said pull-down engaging a film in said magazine when said magazine is within said compartment for advancing the film from one of said supports toward the other thereof, a power-receiving gear operable by said power-transmitting connection of said apparatus when said magazine is disposed in said compartment, said power-receiving gear being disposed within the cross-sectional area of said magazine for engagement with and powered operation by said power-transmitting gear of said apparatus, a power-transmitting train between said power-receiving gear and said take-up support, a toothed detent structure revoluble with each of said supports, a yoke each arm of which embodies a locking tooth for cooperating with each of said detent structures respectively, a spring for moving said yoke so that said teeth engage said structure to lock said supports against movement, said yoke also embodying a cam follower, a plunger disposed within a central opening of said motion-receiving gear for bodily movement along the axis of rotation of said gear independently of the rotation of said gear and extending therebelow within the cross sectional area of said magazine, one of said gears having external teeth and the other of said gears having internal teeth whereby when said magazine is disposed in said compartment said gears are drivingly engaged with one within the other, a cam disposed upon the upper end of said plunger disposed adjacent said cam follower, the positioning of said magazine within said compartment being effective to bring said plunger and the center of said motion-transmitting gear into engagement with each other, such engagement being effective to raise said shaft and said cam and thereby move said follower so that said teeth are removed from the teeth of said detent structures so that said supports may be moved.

19. In the combination of film handling apparatus and a film magazine, said film handling apparatus having a magazine-receiving compartment, a source of power, a pull-down operated by said source of power, and a connection for transmitting power from said source to said magazine when it is disposed in said compartment, said magazine having a delivery support for a film, a take-up support for the film, means establishing an apertured channel through which the film passes from said delivery support to said take-up support, said pull-down engaging the film when said magazine is within said compartment for advancing the film from one of said supports to the other thereof, a power-receiving connection operable by said power-transmitting connection of said apparatus when said magazine is in said compartment, means for driving said take-up support from said power-receiving connection, a lock for at least one of said supports which when effective prevents the rotation thereof, and means for rendering said lock ineffective so that said power from said source may operate said take up support, said means including an actuating member so disposed that it is operated and moved to release said lock so that said support may freely rotate by contact with said power-transmitting connection when said power-receiving connection of said magazine is placed in power-receiving relation to said power transmitting connection of said apparatus.

20. In a film magazine for use in a film handling apparatus; said apparatus having a source of power, a magazine-receiving compartment, and means for transmitting power from said source to a magazine disposed in said compartment, said means including a motion-transmitting gear disposed within said compartment; said magazine comprising a delivery support, a take-up support, a detent revoluble with each of said supports, an operable locking mechanism having a tooth cooperating with each of said detents respectively, a spring for normally moving said mechanism so that said teeth engage said detents to lock said supports against movement, said mechanism also embodying a cam follower, a train of gears for transmitting motion from said apparatus to said take-up support, the motion-receiving member of said gear train being disposed within the cross sectional area of said magazines, a plunger disposed within a central opening of said motion-receiving gear for bodily movement along the axis of rotation of said gear independently of the rotation of said gear and extending therebelow, a cam operatively connected to the upper end of said plunger and operable by its movement, said cam being disposed adjacent said cam follower, the positioning of said magazine within said compartment thereby being effective to bring said shaft and the center of said motion-transmitting gear of the apparatus into engagement with each other, such engagement being effecitve to raise said shaft and said cam and thereby move said follower so that said teeth are removed from said detents so that said supports may be moved.

21. For use in a film handling apparatus having a source of power, a magazine-receiving compartment for transmitting power from said source to a magazine disposed in said compartment, a pull-down extending into said compartment for intermittently feeding a film housed within said magazine, said means including a motion-transmitting gear disposed within said compartment; said magazine comprising a delivery support, a take-up support, means establishing an apertured channel between said supports through which the film extends, said pulldown advancing the film past the aperture of said channel when the magazine is disposed within its compartment, a device for recording the footage of film which has been fed from said delivery to said take-up support, mechanism for locking said supports against rotation, said locking mechanism including a motion-receiving control member for moving said mechanism between locking and free-running positions, a train of gears for transmitting motion from said apparatus to said take-up support and to said footage recording device, a motion-receiving member of said gear train being disposed within the cross-sectional area of said magazine, a collar for supporting said motion-receiving gear for revolution within said magazine, a gear of said train being attached to and rotatable with said motion-receiving gear, other gears of said train transmitting motion from said last-mentioned gear to said footage recording device, a shaft attached to and rotatable with said gear, a gear of said train being attached to and rotated by the upper portion of said shaft, other members of said train transmitting power from said last mentioned gear to said footage recording device, a plunger disposed within a central opening of said motion-receiving gear for bodily movement along the axis of rotation of said gear independently of the rotation thereof, said gear being formed with such an opening, said plunger extending therebelow within the cross-sectional area of the magazine, a motion-transmitting control member movable with the upper end of said plunger and disposed adjacent said control-receiving member of said locking mechanism, the positioning of said magazine within said compartment being effective to bring said shaft and the center of said motion-transmitting gear of the apparatus into engagement with each other, such engagement being effective to raise said shaft and said motion-transmitting control member thereby operating said locking mechanism in operative position.

22. In a film magazine adapted for use with a film handling apparatus which has a source of power and a connection for transmitting power from said source to said magazine when it is assembled therewith, said magazine having a delivery support for a film, a take-up support for the film, a power-receiving connection for said take-up support operable by the power transmitting connection of said apparatus, a lock for at least one of said supports which when effective prevents the rotation thereof, means for rendering said lock ineffective so that said power of said apparatus may move the film from one of same supports to the other thereof, and an actuating member for said means for rendering said locking means ineffective, said actuating member being free of operative engagement with said power-receiving connection and being so disposed that it is operated to release said lock so that said support may freely rotate by the act of placing said power-receiving connection of said magazine in power-receiving relation to said power transmitting connection of said apparatus.

23. A film magazine for use in a film handling apparatus; said apparatus having a source of power, a magazine-receiving compartment, and means for transmitting power from said source to a magazine disposed in said compartment, said means including a motion-transmitting gear disposed within said compartment; said magazine comprising a delivery support, a take-up support, a toothed detent structure revoluble with each of said supports, a yoke each arm of which embodies a locking tooth cooperating with each of said detent structures respectively, a spring for moving said yoke so that said teeth engage said structures to lock said supports against movement, said yoke also embodying a cam follower, a train of gears for transmitting motion from said apparatus to said take-up support, the motion-receiving member of said gear train being disposed within the cross sectional area of said magazine within a light-proofed formation in a wall of said magazine for engagement with and powered operation by said motion-transmitting gear of said apparatus, said magazine having such a formation, a plunger disposed within a central opening of said motion-receiving gear for bodily movement along the axis of rotation of said gear independently of the rotation of said gear and extending therebelow within the cross sectional area of said formation, one of said gears having external teeth and other of said gears having internal teeth whereby when said magazine is disposed in said compartment said gears are drivingly engaged with one within the other, a cam disposed upon the upper end of said plunger and disposed adjacent said cam follower, the positioning of said magazine within said compartment being effective to bring said plunger and the center of said motion-transmitting gear into engagement with each other, such engagement being effective to raise said shaft and said cam and thereby move said follower so that said teeth are removed from said serrations so that said supports may be moved.

24. In a magazine for use in a film handling apparatus; said film handling apparatus having a magazine-receiving compartment, a source of power and a motion-transmitting gear disposed in said compartment for engaging and driving a motion-receiving gear of said magazine when said magazine is disposed in said compartment; said magazine having a delivery support for a film, a take-up support for the film, mechanism for locking at least one of said supports against rotation thereby preventing the unwanted unwinding of the film, said mechanism including a cam follower which upon movement renders said mechanism inoperative thereby freeing the film, a motion-receiving gear formed with an opening extending along its longitudinal axis, said motion-transmitting gear of said apparatus and said motion-receiving gear of said magazine being so disposed in relation to each other and said magazine-receiving compartment that when said magazine is disposed within said compartment said gears engage, a plunger disposed within said opening in said motion-receiving gear and extending above and below the body of said gear, a cam, a mount for said cam upon the upper end of said plunger whereby said cam is bodily movable longitudinally and rotational independently of said plunger, such longitudinal movement of said plunger caused by engagement with a portion of said motion-transmitting gear of said apparatus moving said cam into operative contact with said follower thereby rendering said lock ineffective upon said support but rotation of said shaft being without effect upon said cam.

25. In a magazine for use in a film handling apparatus; said film handling apparatus having a magazine-receiving compartment, a source of power and a motion-transmitting gear disposed in said compartment for engaging and driving a motion-receiving gear of said magazine when said magazine is disposed in said compartment; said magazine having a delivery support for a film, a take-up support for the film, mechanism for locking at least one of said supports against rotation thereby preventing the unwanted unwinding of the film, said mechanism including a cam follower which upon movement renders said mechanism inoperative thereby freeing the film, a motion-receiving gear formed with an opening extending along its longitudinal axis, said motion-transmitting gear of said apparatus and said motion-receiving gear of said magazine being so disposed in relation to each other and said magazine-receiving compartment that when said magazine is disposed within said compartment said gears engage, a first plunger disposed within said opening in said opening in said motion-receiving gear and extending above and below the body of said gear, a cup mounted upon the upper end of said plunger and revoluble therewith, a ball freely revoluble in said cup, a second plunger supported by said ball, a guide for said plunger upon which it is vertically movable as said first plunger is so moved, the revolution of said first plunger being without substantial effect upon said second plunger, a cam, a mount for said cam upon the upper end of said second plunger whereby said cam is bodily movable longitudinally and rotational independently of said plunger, such longitudinal movement of said plunger caused by engagement with a portion of said motion-transmitting gear of said apparatus moving said cam into operative contact with said follower thereby rendering said lock ineffective upon said support but rotation of said shaft being without effect upon said cam.

26. In a film handling apparatus having the Bundick and Proctor tension control system of feeding wherein a film is intermittently movable between a delivery mass and a take-up mass past an aperture and the sections of the film disposed between said delivery mass and said take-up mass respectively are maintained continuously under tension and move in step with the intermittency at the aperture; a first primary resilient tensioning member engaging one side of the film between said aperture and said delivery mass and movable in step with said intermittency, a first auxiliary resilient tensioning member engaging the other side of the film between its line of engagement by said first member and said delivery mass for supplementing the resilience of said first primary member and maintaining the film in continuous and close engagement with said first member and in the form of a bight, a second primary resilient tensioning member engaging the same side of the film as that engaged by said first primary member between the aperture and the take-up mass and movable in step with said intermittency, and a second auxiliary resilient tensioning member engaging the other side of said film adjacent its line of engagement by said second primary member and between said line and said take-up mass for supplementing the resilient effect of said second primary member and maintaining the film in continuous and close engagement therewith and in the form of a bight irrespective of the amount of film upon the adjacent mass, the disposition of each of said primary members and said secondary members associated therewith forming the film into bights which are obtuse.

27. In a film handling apparatus, a delivery support for a film, a take-up support for the film, apertured means establishing a path for the film between said supports, an intermittent pull-down for advancing the film from said delivery support past said aperture toward said take-up support, said film being advanced from one of said supports past said aperture by said intermittent pull-down and wound up upon the other of said supports, and a single leaf spring disposed between said aperture and one of said supports and embodying two spaced curvilinear sections each engaging the film in a bight between said aperture and said adjacent support, the resilience of said spring at on of said bights being materially greater than that of the other thereof, said spring thereby furnishing resilience of different magnitudes to the film in its passage in relation to said aperture at two spaced points.

28. In a film handling apparatus, a delivery support for a film, a take-up support for the film, apertured means establishing a path for the film between said supports, an intermittent pull-down for advancing the film from said delivery support past said aperture toward said take-up support, said film being advanced from one of said supports past said aperture by said intermittent pull-down and wound upon the other of said supports, and a single relatively long leaf spring disposed between said aperture and one of said supports for tensioning and guiding the film and embodying two spaced curvilinear sections each engaging the film in a bight between said aperture and said adjacent support, said spring thereby furnishing resilience to the film in its passage in relation to said aperture at two spaced points, the spacing of said curvilinear sections which engages the film reducing the drag upon the film in the tensioning operation and extending the effective guiding length upon the film.

29. In a film containing magazine having an aperture in one edge wall, a delivery support, and a take-up support for a film housed within said magazine, the film being advanced intermittently from one of said supports past an aperture to the other thereof, said magazine being adapted for use in a film handling apparatus having an intermittent pull-down, a tension controlling and guiding leaf spring forming a substantial portion of one wall of a passage way extending from one of said supports to said aperture, the other wall of said passage way being formed by an edge wall of the magazine, said spring including two spaced curvilinear portions engaging the same side of the film within said passage way for guiding and conditioning its movement between said support and said aperture.

30. In a film magazine, an apertured gate member, a delivery support on one side of said gate, a take-up support on the other side of said gate, a film passing between said supports through said gate and past the aperture thereof, a primary spring member extending from each end of said gate toward the adjacent film support to form a side of a guiding channel for the film and also to condition its movement, each of said members engaging the film at two spaced points whereby the total drag on the film imposed by said members is lessened while the channel defining length is relatively great, and two auxiliary tensioning members each engaging the side of the film opposite that engaged by said primary members and being disposed between the end of each of said members and the relatively adjacent film support, the disposition of the film engaging portions of said primary and secondary members being such that all angles established thereby in the film are obtuse.

31. In a film magazine for use with a film handling apparatus having an intermittent pull-down for advancing a film, a magazine-receiving compartment, and means for driving a take-up support within a magazine when the magazine is disposed in said compartment; said magazine having a support for a delivery mass of a film, a support for a take-up mass thereof, apertured means for maintaining the film in contact with said pull-down, the film passing from said delivery support past said aperture to said take-up support, a first primary resilient delivery tensioning member in the form of a leaf spring engaging one side of the film along a line between said aperture and said delivery mass, a first auxiliary delivery tensioning member engaging the other side of the film between said line and said delivery mass for maintaining the film in close and constant relation with said delivery tensioning member, said two delivery tensioning members cooperating to maintain the film under constant resilient tension and moving it in step with the intermittency of the pull-down, a second primary resilient take-up tensioning member in the form of a leaf spring engaging one side of the film between the aperture and said take-up support, and a second auxiliary tensioning member engaging the other side of the film between said line and said take-up mass for holding it in close and continuous relation to said primary take-up member, said primary and auxiliary tensioning members cooperating to maintain the film under continuous tension and to move it in step with its intermittent advance past said aperture.

32. In a film magazine for use in a film handling apparatus; said apparatus having a magazine-receiving compartment, an intermittent pull-down for engagement with a film contained within a magazine disposed within said compartment, a motion-transmitting connection for cooperation with a motion-receiving connection of a magazine when it is disposed in said compartment; said magazine having an outer protective casing, said casing comprising side walls held in spaced parallelism by edge walls, a first of said edge walls of said casing having an aperture, a support for a delivery mass of a film, a support for a take-up mass of the film, the film passing from said delivery mass to said take-up mass adjacent said first edge wall containing said aperture, a first primary leaf spring extending away from said aperture toward said delivery mass along and adjacent but spaced from a second edge wall of the magazine and near its end relatively remote from said aperture engaging one side of the film, said second edge wall being disposed at right angles to said first or apertured edge wall and said first primary leaf spring cooperating with said edge wall to form a channel for the film leading from said delivery mass toward said aperture, an auxiliary leaf spring also extending along said wall and engaging the other side of the film between its point of engagement with said first primary spring and said delivery mass, said first auxiliary spring cooperating with said first primary spring to form a bight in the film between said delivery mass and said primary spring and maintaining the film in close and constant engagement with said first primary spring, a second primary leaf spring extending away from said aperture toward said take-up mass along but spaced from a third edge wall, said third edge wall being disposed at right angles to said first edge wall and parallel to said second edge wall, said second primary spring engaging the film near its end relatively distant from said aperture, said second primary spring cooperating with said third edge wall to form a channel leading from said aperture to said take-up mass, and a second auxiliary leaf spring engaging the side of the film opposite that engaged by said primary take-up spring along a line between its line of engagement between said second primary spring and said take-up mass, said second auxiliary spring cooperating with said second primary spring to form a bight in the film between said take-up mass and said second primary spring and to maintain the film in close and constant engagement with said primary spring.

33. For use in a film-containing magazine having an outer protective container, said container having two side walls held in spaced parallelism to each other by edge walls, one edge wall having a film-exposing aperture, a delivery support and a take-up support for a film within said magazine, and at least one gate plate for directing the film from one of said supports toward the other thereof past said aperture and for holding it in engagement with a pull-down disposed upon a film handling apparatus for use with which said magazine is adapted; a single curved leaf spring, said leaf spring being disposed parallel to and adjacent but spaced inwardly from the front top and bottom edge walls of said container, said walls being continuous with each other and including the wall with said aperture, said leaf spring extending in each direction from said aperture toward said delivery and take-up supports respectively, said leaf spring thereby cooperating with said edge walls to form one side of a passage way for the film between said supports and past said aperture, the portion of said leaf spring between said aperture and each of said supports being formed into two curvilinear sections which engage the film in spaced bights, two of said bights therefore being between the aperture and each of said supports, and means for supporting said spring within said magazine, said spring both conditioning the intermittent movement of the film and as aforesaid furnishing a wall of said passage way.

34. In a film magazine; said magazine being adapted for use with a film handling apparatus which has a source of power and a connection for transmitting motion from said source to said magazine when said magazine is assembled therewith; said magazine having a delivery support for the film, a take-up support for the film, a motion-receiving connection for said take-up support operable by the motion-transmitting connection of said apparatus, a device for recording the footage of film which has been fed from one of said supports to the other, a lock for at least one of said supports which when effective prevents the rotation thereof, a power-transmitting train of gears between said motion-receiving connection and said take-up support and said footage recording device for directly driving each thereof, and means for rendering said lock effective except when said power-receiving connection of said magazine is disposed in said motion-receiving relation to said motion-transmitting connection of said apparatus, said means including a spring normally holding said lock in locking relation to said support and an actuating member for moving said lock against the power of said spring thereby rendering said lock ineffective, said actuating member being so disposed that it is operated and released to move said lock so that said support may freely rotate by contact between said motion-transmitting and motion-receiving connections when said magazine is placed in motion-receiving relation to said apparatus.

35. A magazine for use in a film handling apparatus; said apparatus having a source of power, a magazine-receiving compartment, and means for transmitting power from said source to a magazine disposed in said compartment, said means including a motion-transmitting gear disposed within said compartment; said magazine comprising a delivery support, a take-up support, a locking mechanism having elements moveable between a locking position wherein it engages at least one of said supports whereby said support is locked against rotation and the film against movement and another or unlocked position wherein said support is free to revolve whereby the film may be freely fed, said mechanism embodying a motion-receiving control member for moving said locking mechanism from said locked to said unlocked position, means for moving said mechanism from said unlocked to said locked position, a train of gears for transmitting motion to said take-up, a motion-receiving member of said train being so disposed that when the magazine is disposed in said compartment it engages said gear of said apparatus and is driven thereby, a plunger within a central opening of said motion-receiving gear for bodily movement along the axis of rotation of said gear independently of the rotation thereof and extending therebelow, the upper portion of said plunger extending above said gear and embodying a motion-transmitting control member positioned and adapted to operate said motion-receiving control member of said locking mechanism for moving it from said locked to said unlocked position, the positioning of said magazine within said compartment bringing said shaft into contact with said motion-transmitting gear of the apparatus, such engagement being effective to raise said shaft thereby operating said shaft and thereby operating said motion-transmitting conrol member so that said locking mechanism is unlocked.

36. In a film magazine adapted for use with a film handling apparatus having a source of power and a connection for transmitting motion from said source to said magazine when said magazine is assembled therewith, means within said magazine for moving a film, a revoluble motion-receiving gear mounted upon said magazine, a motion-transmitting train between said gear and said film moving means, operable mechanism within said magazine movable between two work positions, and an actuating plunger for said mechanism, said plunger being disposed within a central opening along the axis of rotation of said motion-receiving gear and being bodily movable along said axis independently of the rotation of said gear and extending therebeyond in both directions, said gear being formed with such an opening, and said plunger being so disposed that when said magazine is assembled with said apparatus with said motion-transmitting connection and said motion-receiving gear in contact one of the ends of said plunger is engaged and bodily moved by contact with said motion-transmitting means of said apparatus and the other end operatively engages and moves said operable mechanism, whereby when said power-receiving element and power-transmitting connection are placed in cooperative relation with each other said mechanism is operated by movement from one of said work positions to the other.

37. In a film magazine, a delivery support, a take-up support, a rotatable connection for receiving power from the apparatus with which the magazine is to be used, said apparatus having a rotatable power-transmitting connection, a power train between said motion-receiving connection and said take-up support, a locking mechanism for preventing the unwanted rotation of at least one of said supports, said locking mechanism including an actuating member for rendering said lock ineffective, said actuating member being mounted upon said power-receiving connection for bodily movement therewith and operative movement independent of the rotation thereof and being made operative when said power-receiving connection is placed in operative relation to said power-transmitting connection of said apparatus whereby said lock is withdrawn independently of the rotation of said connection and after it has been placed in operative condition to be rotated.

38. In a film magazine for use in a film handling apparatus; said apparatus having a magazine-receiving compartment, a source of power and a connection within said compartment for transmitting power from said source to said magazine; said magazine having an operable mechanism movable between two work positions, film moving means, a motion-transmitting train for said moving means, said train including a rotatable motion-receiving connection so positioned as to be engaged by said motion-transmitting connection of said apparatus when said magazine is placed within said compartment, a plunger longitudinally bodily movable within an opening within said motion-receiving connection, said connection being formed with such an opening, such bodily movement being independent of the rotation of said motion-receiving connection, said plunger extending below the lower face of said motion-receiving connection, a first or motion-transmitting control element mounted for bodily movement with the other or upper end of said plunger, and a second or motion-receiving control element for operating said operable mechanism, said second control element being so disposed that when said plunger is longitudinally moved by contact with said motion-transmitting connection of said apparatus said first control element engages and operates said second control element thereby operating said mechanism.

39. In combination, a film handling apparatus and a film magazine, said apparatus having a magazine-receiving compartment, a source of power, a pull-down driven by said source of power and adapted to engage a film within a magazine when within said compartment, and a connection within said compartment for transmitting power from said source to a magazine; said magazine having an operable mechanism movable between two work positions, a delivery support, a take-up support, a film moving between said supports, a gear train for operating at least one of said supports, said train including a rotatable motion-receiving connection mounted within the cross-sectional area of said magazine and so positioned as to be engageable by said motion-transmitting connection of said apparatus when said magazine is placed within said compartment, a wall of said magazine being formed with an exterior light-proofed chamber for said gear, a plunger longitudinally bodily movable within an opening within said motion-receiving connection, such bodily movement being independent of the rotation of said motion-receiving connection, said connection being formed with such an opening, said plunger extending below the lower face of said motion-receiving connection and being disposed within said chamber, a cam disposed upon the other or upper end of said plunger and bodily movable therewith, and a cam follower for operating said mechanism, said follower being so disposed that when said plunger is moved by contact with said motion-transmitting connection of said apparatus said cam engages and operates said follower thereby operating said mechanism.

40. A magazine for use in a film handling apparatus; said film handling apparatus having a magazine-receiving compartment, a source of power, and a motion-transmitting gear disposed in said compartment for driving engagement with a motion-receiving gear of said magazine when said magazine is disposed in said compartment; said magazine having an operable mechanism therewithin movable between two positions, a motion-transmitting train for driving said support by the power of the apparatus when the magazine is within said compartment, said train including a motion-receiving gear, said gear being so disposed as to be drivingly engaged by said motion-transmitting gear of said apparatus when the magazine is within said compartment, a first plunger disposed within said gear in an opening along the longitudinal vertical axis, said gear being provided such an opening and said first plunger extending above and below the cross-sectional area of said gear, a cup disposed upon the end of said plunger other than that extending through said gear, a ball disposed in said cup of a second plunger disposed above said ball, a head attached to said plunger and resting on said ball, means for guiding said plunger and ball, an operating control element attached to and operable by a movement of said second plunger, an operating element for said operable mechanism, said operable element for said operable mechanism being so disposed that it is engaged and operated by the vertical movement of said second plunger under the influence of said first plunger when it engages the center of said motion-transmitting gear of said apparatus whereby said operable mechanism is moved from one of said work positions to the other when said magazine is placed within said magazine-receiving compartment of said apparatus.

References Cited in the file of this patent

UNITED STATES PATENTS

| | | |
|---|---|---|
| 397,228 | Emerick | Feb. 5, 1889 |
| 1,372,675 | Davis | Mar. 29, 1921 |
| 1,784,138 | Gottschau | Dec. 9, 1930 |
| 1,861,584 | Readeker et al. | June 7, 1932 |
| 1,946,605 | Wittel | Feb. 13, 1934 |
| 2,094,095 | Collins | Sept. 28, 1937 |
| 2,094,669 | Pratt | Oct. 5, 1937 |
| 2,159,998 | Morsbach et al. | May 30, 1939 |
| 2,161,341 | Fairbanks | June 6, 1939 |
| 2,163,179 | Porter | June 20, 1939 |
| 2,206,032 | Foster | July 2, 1940 |
| 2,226,363 | Williams | Dec. 24, 1940 |
| 2,326,654 | Jagust | Aug. 10, 1943 |
| 2,366,655 | Russey | Jan. 2, 1945 |
| 2,464,180 | Jacobson | Mar. 8, 1949 |
| 2,492,979 | Freer | Jan. 3, 1950 |

FOREIGN PATENTS

| | | |
|---|---|---|
| 193,364 | Switzerland | Dec. 16, 1937 |